No. 865,197. PATENTED SEPT. 3, 1907.
E. MEIER.
STORAGE PLANT.
APPLICATION FILED APR. 16, 1907.
2 SHEETS—SHEET 1.
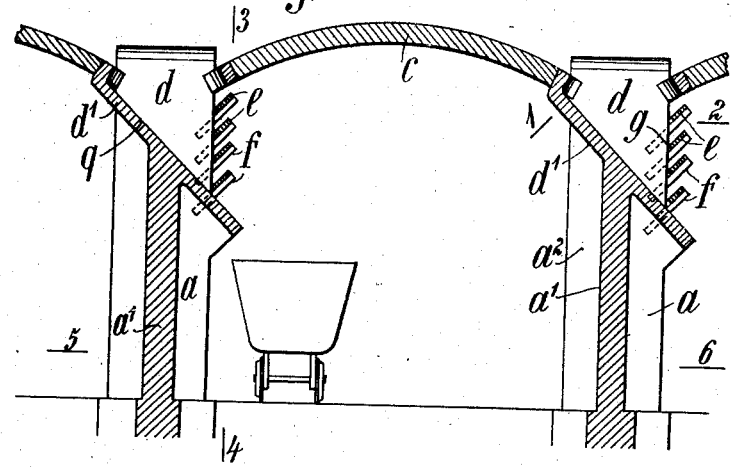
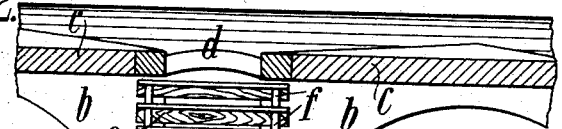
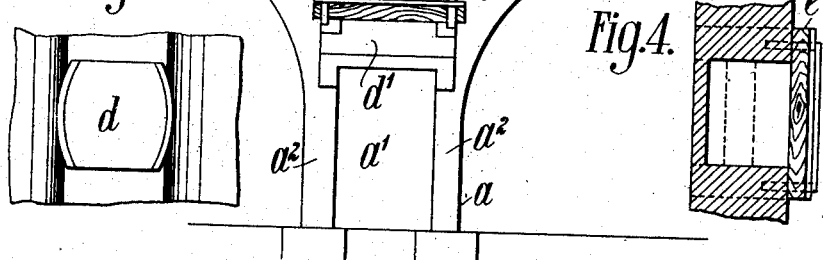
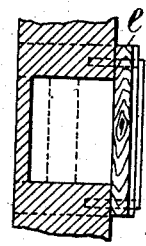
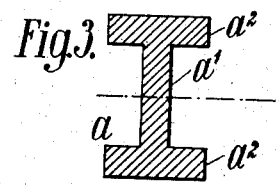
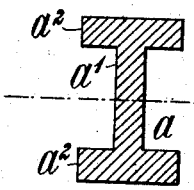

No. 865,197. PATENTED SEPT. 3, 1907.
E. MEIER.
STORAGE PLANT.
APPLICATION FILED APR. 16, 1907.

2 SHEETS—SHEET 2.

WITNESSES
Wallie Abbe
L. H. Grote.

INVENTOR
Ernst Meier
BY
Howson and Howson
ATTORNEYS

UNITED STATES PATENT OFFICE.

ERNST MEIER, OF SCHÖNEBERG, NEAR BERLIN, GERMANY.

STORAGE PLANT.

No. 865,197.  Specification of Letters Patent.  Patented Sept. 3, 1907.

Application filed April 16, 1907. Serial No. 368,553.

*To all whom it may concern:*

Be it known that I, ERNST MEIER, a subject of the King of Prussia, residing at 12 Akazienstrasse, Schöneberg, near Berlin, Germany, have invented certain new and useful Improvements in Storage Plants; and I do hereby declare the following to be a full, clear, and exact description of the invention.

The present invention relates to a storage plant having an arched or flat bottom or floor which is supported by pillars and which is provided with discharge openings.

The invention consists substantially in the edges of said discharge openings in the floor being directly supported by the pillars.

Figure 6:
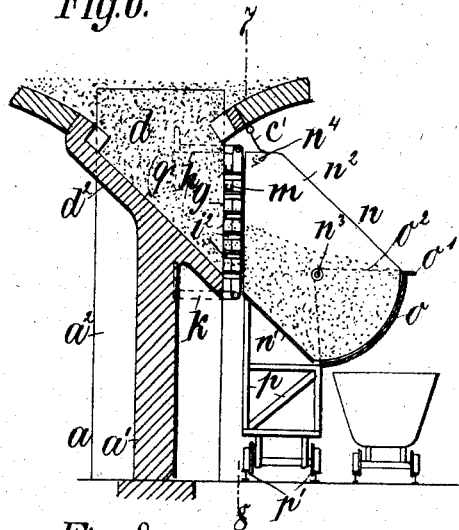
Figure 7:
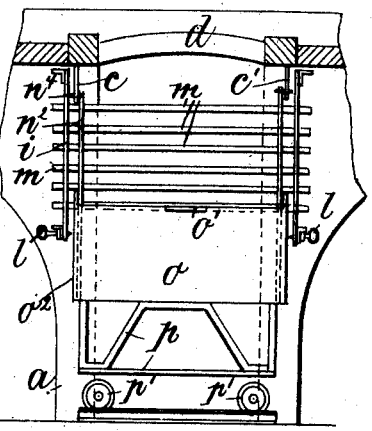
Figure 8:
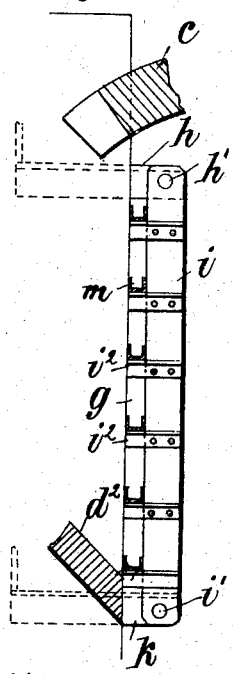
Figure 9:
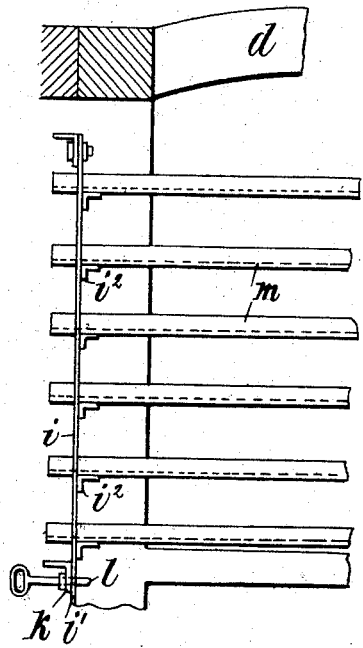

In order that the invention may be clearly understood reference is made to the accompanying drawings in which several embodiments are represented by way of example, and in which:

Figure 1 is a vertical section through an arch as well as through two pillars of the floor of the storage plant; Fig. 2 is a vertical section on the line 3—4 in Fig. 1; Fig. 3 is a horizontal section on the line 5—6 in Fig. 1; Fig. 4 is a section on the line 1—2 in Fig. 1; Fig. 5 is a plan of a discharge opening; Fig. 6 is a vertical section through another form of storage plant; Fig. 7 is a section on the line 7—8 in Fig. 6; Figs. 8 and 9 are sections similar to Figs. 6 and 7 and show the shutting device on an enlarged scale.

The floor of the store house or magazine consists of vaults or arches $c$ (Fig. 1) which are supported by arch-piers or pillars $a$ and binding arches $b$ between the latter. In the plant represented in the drawing, the pillars $a$ have an I-shaped cross-section, so that they have a web $a'$ and two flanges $a^2$. Immediately over each pillar $a$ there is an opening $d$ in the floor or bottom which is used for drawing off the material, such as coal, grain and so on, which is on the floor. This opening $d$ is made in such a manner that the edge of the same is supported directly by the flanges $a^2$ of the pillars. Under each discharge opening $d$ there is provided a slide-way or chute $d'$ which is supported by the web $a'$ of the pillar, with which it may be integral as shown. In the plant represented this chute $d'$ together with the flanges $a^2$ of the pillars forms a funnel-shaped channel $q$ through which the material coming from the opening $d$ can be conveyed laterally into a wagon or the like. This channel may be closed at the side opening by a grating which consists of planks, beams or iron bars $e$. The planks are preferably arranged at right angles to the direction of the pressure of the material which is to be discharged, and rest on supporting brackets or arms $f$ which are built into the flanges $a^2$ of the pillars. When the material is to be withdrawn from an opening $d$, the planks $e$ are knocked down from the arms $f$ so that the material can escape through the opening $d$ and the lateral opening $g$ of the channel $q$.

In the form according to Figs. 6 to 9 angle irons $h$ are built into the pillars $a$ below each discharge opening $d$, and flat bars $i$ are revolubly suspended from them by means of pivots $h'$. Also angle irons $k$ are built into the pillars $a$, said angle irons being provided with a hole $k'$ (Fig. 9). There are corresponding holes $i'$ provided at the lower end of the bars $i$. Pins $l$ are inserted through the holes $i'$ in order to fasten the bars $i$ to the angle irons $k$. Brackets $i^2$, on which trough-shaped U-irons $m$ lie loosely, are arranged on the bars $i$. These U-irons are arranged in the form of a grid or grating, similarly to the planks $e$ according to Fig. 1, and usually close the lateral discharge opening $g$ of the channel $q$ which is formed by the chute $d^2$ and the flanges $a^2$ of the pillars.

When the material is to be drawn off, it is only necessary to pull the pins $l$ from the holes $k'$, $i'$. In this case the frame which consists of the bars $i$ and the U-irons $m$ is swung up by the pressure of the mass which is to be discharged, and the U-irons $m$ slide off from the brackets $i^2$. When all the material has passed through the openings $d$ and $g$, the U-irons $m$ are again placed on the brackets $i^2$ and the bars are connected with the angle irons $k$ by means of the pins $l$.

In case it is desired to withdraw only a part of the material through the openings $d$ and $g$, an additional transportable auxiliary hopper $n$ (Fig. 6) is used. This auxiliary hopper $n$ is provided with a sloping plate $n'$ (Fig. 6) and two side plates $n^2$, and is generally closed at its lower end by a curved slide $o$ to which a handle $o'$ is attached. The slide $o$ is provided with sector-shaped side plates $o^2$ which are revoluble on pivots $n^3$ on the sides $n^2$ of the hopper. The hopper $n$ is arranged on a frame $p$ which rests on wheels $p'$. Pins $n^4$ are attached to the sides $n^2$ of the hopper, with which pins hooks $c'$ can engage, said hooks being arranged pivotally on the floor $c$.

When the material is to be partially emptied from a discharge opening $d$ the auxiliary hopper $n$ is moved in front of the lateral opening $g$ of the channel $q$ which is situated under said opening $d$, and the hooks $c'$ are placed over the pins $n^4$. The pins $l$ (Fig. 9) are then pulled out of the holes $k'$, $i'$. Consequently the bars $i$ are swung forward somewhat, by the pressure which is exercised by the material on the U-irons $m$, until the latter are situated at the edge of the sides $n^2$ of the hopper. The U-irons are then driven sidewise singly by a hammer or the like until they are released from the edge of the one side $n^2$ of the hopper. As soon as they are released from this side they are sent into this hopper $n$ by the material which flows into the same.

When all the U-irons $m$ have been removed from the opening $g$ in the manner described, the material is withdrawn as desired by opening the slide o. If the withdrawal of said material is to be interrupted, the slide o is shut, and the bars i are again secured by inserting the pins l through the holes k', i' (Fig. 9). The U-irons m are then placed on the brackets i² again in the following manner. A workman goes to the material which is in the hopper n and in the first place slopes or shovels away so much of the material which is in the hopper n near the upper end of the opening g that the uppermost U-iron m can be placed on the respective brackets i². This uppermost U-iron m may be put in place by the same being first pushed out sidewise from the inside of the hopper n behind the one bar i and then sidewise behind the other bar i. When the uppermost U-iron m is placed on the respective brackets i², the material which is in the hopper n is then sloped off still more in order to be able to place the second uppermost U-iron m on the respective brackets i², and in this manner the material in the hopper n is sloped off step by step until all the U-irons are again placed on the brackets i². In accordance with Fig. 6 the material in the hopper n has been sloped off so much that the third U-iron m from the top can be placed in position. When all the U-irons are again placed on the brackets i², the auxiliary hopper n can be removed again after the hooks c' have been released.

The auxiliary hopper n may also be employed with the closing device e, f represented in Fig. 1.

Instead of the I-shaped cross-section represented in the drawing, the pillars may have a square, U-shaped or other cross-section. Also instead of single pillars, groups of several pillars may be provided, for example four props or columns standing at the corners of a quadrangle, between which the discharge openings are arranged.

The bays may also rest on iron girders supported by the pillars instead of on binding arches.

Masonry, concrete, beton with iron embedded therein may be used as building material for the plant.

What I claim as my invention and desire to secure by Letters Patent is:—

1. In a structure for storage purposes or the like, a floor, supporting piers therefor, and integral binding arches between said piers, said floor having openings directly over said piers and between said binding arches, in combination with chutes beneath said openings, substantially as described.

2. In a structure for storage purposes or the like, piers arched at their upper ends, an arched floor having openings over said piers, in combination with inclined chutes beneath said openings.

3. In a structure for storage purposes or the like, arch piers and arched floor having openings over said piers, integral binding arches between said piers, in combination with inclined chutes beneath said openings.

4. In a structure for storage purposes or the like, floor piers having flanges with a connecting web, a floor supported thereby having openings directly over the webs of said piers and inclined chutes below said openings, substantially as described.

5. In a structure for storage purposes or the like, floor piers having flanges with a connecting web, a floor supported thereby having openings directly over said piers and inclined chutes beneath said openings, in combination with removable grates mounted on the sides of said piers for closing said chutes, substantially as described.

6. In a structure for storage purpose or the like, integral floor piers, the floor supported thereby, having openings directly over said piers and inclined chutes beneath said openings, in combination with removable grates pivotally mounted on the flanges of said piers for closing said chutes, substantially as described.

7. In a structure for storage purposes or the like, integral floor piers having flanges with connecting webs, a floor supported thereby, having openings directly over said piers and inclined chutes beneath said openings, in combination with a closing device for said chute consisting of bars pivotally mounted on said piers, brackets on said bars and transverse members loose on said brackets, substantially as described.

In testimony whereof I have signed my name to this specification, in the presence of two subscribing witnesses.

ERNST MEIER.

Witnesses:
JOHANNA HEIN,
WOLDEMAR HAUPT.